United States Patent
Marinho Vianna et al.

(10) Patent No.: US 12,123,267 B2
(45) Date of Patent: Oct. 22, 2024

(54) METHOD OF APPLICATION OF LOW SALINITY VISCOUS FLUID IN DRILLING SALINE FORMATIONS

(71) Applicant: Petróleo Brasileiro S.A.—Petrobras, Rio de Janeiro (BR)

(72) Inventors: Angelo Marinho Vianna, Rio de Janeiro (BR); Jorge Luiz De Queiros E Feijo, Rio de Janeiro (BR); Leonardo Silva De Almeida, Rio de Janeiro (BR); Walter Francisco Cardoso, Jr., Rio de Janeiro (BR); Fabio Fabri, Santos (BR)

(73) Assignee: Petróleo Brasileiro S. A.—Petrobras, Rio de Janeiro (BR)

( * ) Notice: Subject to any disclaimer, the term of this patent is extended or adjusted under 35 U.S.C. 154(b) by 68 days.

(21) Appl. No.: 18/112,052

(22) Filed: Feb. 21, 2023

(65) Prior Publication Data
US 2023/0265726 A1    Aug. 24, 2023

(51) Int. Cl.
| | | |
|---|---|---|
| *E21B 21/01* | (2006.01) | |
| *C09K 8/20* | (2006.01) | |
| *E21B 21/00* | (2006.01) | |
| *E21B 21/06* | (2006.01) | |
| *E21B 21/08* | (2006.01) | |

(52) U.S. Cl.
CPC ............ *E21B 21/001* (2013.01); *C09K 8/206* (2013.01); *E21B 21/01* (2013.01); *E21B 21/062* (2013.01); *E21B 21/08* (2013.01)

(58) Field of Classification Search
None
See application file for complete search history.

(56) References Cited

U.S. PATENT DOCUMENTS

| | | |
|---|---|---|
| 2010/0062953 A1 | 3/2010 | Losasso et al. |
| 2010/0184630 A1 | 7/2010 | Sullivan et al. |
| 2016/0230482 A1 | 8/2016 | Rapoport |
| 2017/0022409 A1* | 1/2017 | Mohs ............... E21B 43/26 |

* cited by examiner

*Primary Examiner* — Andrew Sue-Ako
(74) *Attorney, Agent, or Firm* — Mintz, Levin, Cohn, Ferris, Glovsky and Popeo, P.C.

(57) ABSTRACT

The present invention addresses to the use of a viscous fluid in continuous pumping to contain the saline dissolution in a homogeneous way (not limited to just one type of evaporite), highlighting the results of seawater with viscosifiers, due to its simplicity, and that does not have the same impact on the logistical chain as a brine supply. The increase in fluid viscosity limits the diffusion of salt into the medium and thus better contains the dissolution of the well walls, while also promoting a laminar flow regime in the annulus of the well, variables desired to achieve the quality of the operation of cementation. The employment of viscous fluid concentrates allows "on the fly" dilutions with the in-line seawater fraction mixture. The technique can also employ solutions of pre-dispersed viscosifying additives which, when added to seawater, result in a substantial increase in the volume of drilling fluid produced, no longer limited by the unit tank capacity. This allows drilling large extensions of salt. The low salinity viscous fluid is used in drilling operations without fluid return to the drilling rig (riserless) in the presence of a predominantly saline formation, aiming at preserving the phase diameter and improve well construction conditions.

11 Claims, 5 Drawing Sheets

(a)

(b)

200~# METHOD OF APPLICATION OF LOW SALINITY VISCOUS FLUID IN DRILLING SALINE FORMATIONS

CROSS-REFERENCE TO RELATED APPLICATION

This application claims priority to Brazilian Application No. 10 2022 003381 1, filed on Feb. 22, 2022, and entitled "METHOD OF APPLICATION OF LOW SALINITY VISCOUS FLUID IN DRILLING SALINE FORMATIONS," the disclosure of which is incorporated herein by reference in its entirety.

FIELD OF THE INVENTION

The present invention addresses to the use of a low salinity viscous fluid is used in drilling operations without fluid return to the drilling rig (riserless) in the presence of a predominantly saline formation, aiming at preserving the phase diameter and improve well construction conditions.

DESCRIPTION OF THE STATE OF THE ART

As a current practice, a strategy is used that employs high flow rates of seawater interspersed with a fluid of high rheology, called viscous plug, which has the simple function of assisting in the carrying of solids and cleaning the well. It is the simplest practice, as it does not present operational difficulties and little, if any, logistical restrictions for fluid supplies. However, difficulties in running the casing down and the inadequacy of the casing string centralization design are common, which has a great impact on this important functionality, resulting in the requirement for greater volumes of slurry without the corresponding guarantee of cementation quality, which results into great impacts on the integrity of the well.

These difficulties in running the casing down are mainly due to the fact that these saline top extensions present varied intercalations of soluble salts, mainly carnallite, and also the presence of tachyhydrite and sylvinite, which, associated with the drilling mechanisms of the wells (equipment×flow rates×ROP–Rate of Penetration), end up generating a very irregular diameter along the drilled phase when using a low inhibition drilling fluid. The inhibition mechanisms are associated with (i) salinity of the used drilling fluid and the rock solubility constant and (ii) rheology of the used drilling fluid, affecting the saline diffusion in the contact of the fluid with the well wall.

The technique used to minimize this break-down, and which currently represents the commercially available solution for ultra-deep waters, is known as Pump and Dump. It is a technique well established in the industry to cross areas of abnormal pressure (shallow hazards) and also saline formations. The scenario in question imposes a great challenge, mainly logistical, and that can burden the design in the field of fluids, due to the large volumes involved, additives and specialized equipment.

As the name implies, a drilling fluid is used in pumping, where it is constantly discarded to the seabed. This drilling fluid can be specially adapted to the needs (weight flexibility, use of filtrate reducer, pluggers and clay inhibitors, for example), in order to obtain a more calibrated well, with greater stability and with lower ECD (Equivalent Circulating Density) variations.

In the Brazilian pre-salt scenario, the option of adopting this technique in the riserless phases implies large extensions to be drilled, which can make logistical assistance difficult. The solution presented for this scenario by the industry is to use a fluid saturated in sodium chloride to minimize the dissolution of this salt while drilling the saline extension of the formation, being able to use a solution saturated with salt in suspension, in order to provide a larger volume when a fraction of this fluid is cut by a flow of seawater, still preserving its saturation at the end of the mixture.

In the current drilling rigs, there is not enough space to mobilize all the resources on board, mainly without specialized resources and equipment for the practice, thus requiring the use of support vessels to supply the platform with inputs and fluid, in addition to being dependent of metocean conditions, showing that the continuous supply of drilling fluids in this scenario becomes a challenging operation if the success of the operation depends solely and exclusively on this technique. In addition, the use of the saturated sodium chloride solution significantly reduces break-down in sections where halite predominates, and does little to help maintain a homogeneous diameter in sections in the presence of more soluble evaporites (carnallite, sylvinite and tachyhydrite), which are intrinsic characteristics of the top of saline formations, which generate high costs, large disposals of saturated fluid and relatively doubtful gains in terms of well integrity.

The integrity analysis of the well subjected to blowout in the WCD (Worst Case Discharge) condition, also called WCA (Well Containment Analysis) at its most rigorous level, infers it is necessary for the well to allow the installation of capping (equipment for allow closure of the oil-filled well) in order to stop the leak in the well. This criterion is called shut-in. For casings installed on top of the saline sections of the pre-salt wells, penetration of the reservoir occurs when the next phase is drilled, a scenario in which a blowout is conceptually possible. To meet this scenario, in addition to the surface casing installed and the rock itself at the depth of the shoe, the cementing of this casing must provide hydraulic insulation when subjected to this load.

At a non-negligible frequency, the occurrence of the following events is observed during the construction of wells with the surface casing shoe settled on the salt:

Low LOT value (Leak off Test, or absorption test) in relation to the expected strength in the surface casing shoe;

Failure in cementing the intermediate sub-mudline liner seated on top of the salt;

Loss of integrity of the surface casing shoe during drilling in the next phase;

Leakage of synthetic fluid (when used in the next phase) from the outside of the cement sheath of the surface casing settled on top of the salt after the well construction step;

Difficulties in running the surface casing down, leading to anticipating the depth of the shoe above the salt and using contingencies.

Such occurrences imply, in addition to losses in the construction of wells (limitation of the specific weight of the drilling fluid for drilling the salt in the next phase up to the reservoir, need for correction of cementing, etc.), low reliability of the cement sheath to withstand severe loads for containment of fluids in a well closure event. The loading imposed in a blowout event is both mechanical and thermal, and stresses such as casing vibration during drilling can also weaken the cement sheath.

Among the most common causes for these occurrences is the break-down of salt formations by dissolution due to the phase drilling with seawater, and it is observed with great intensity at the top of the evaporitic formations, where the presence of intercalations with various salts (anhydrite, carnallite and tachyhydrite) causes more severe or mild punctual dissolutions, depending on the solubility of each type of salt due to drilling with seawater.

Although the strategy of drilling the salt as quickly as possible is adopted, low drilling rates can be found at certain depths, for example when drilling salts with high competence (high mechanical strength). These sections of low penetration rate increase the exposure time of salt to seawater leading to more break-downs.

It should be mentioned that, since the beginning of the monitoring of the estimated average diameter, the constancy of high break-downs (average diameter much higher than the diameter of the bit) has been observed over time.

The influence of the variable "well diameter" on the quality of cementing directly affects the centralization of the casing and the flow rates of fluids in the annulus during the cementing operation, in addition to impacting the height of the cement slurry. The estimates of open hole diameter and pressure differential at the end of cementing consistently indicate lower cement heights in the annulus when compared to the casing and cementing design and some wells with an extension less than the minimum required by the well initiation design. It should be added that this height of cement does not correspond to the extension of cement that is providing hydraulic insulation.

Document US20100184630A1 discloses compositions and methods of treating a subterranean formation penetrated by a wellbore, including the introduction of a rheological polymer into a subterranean formation, the introduction of a partitioning agent into a subterranean formation and the formation of a heterogeneous mixture comprising a phase rich in dispersed rheological polymer and a phase rich in partitioning agent, wherein the viscosity of the mixture is less than the viscosity of the mixture when no partitioning agent is present.

Document US20100062953A1 discloses a method for modifying the rheological properties of a fluid. The method includes adding to the fluid at least one polymer which is the reaction product of at least one water-soluble allylic monomer and at least one structure-inducing agent. The polymer is adapted to increase the viscosity of the fluid and to impart non-Newtonian characteristics to the fluid.

Document US20160230482A1 discloses an integrated system based on NMR/MRI for analysis and treatment of a drilling mud for a drilling mud recycling line. The system comprises a drilling mud recycling equipment; an NMR/MRI device configured to provide at least one image of at least a portion of the drilling mud and at least one characterized recycle step in the drilling mud recycle line; and a processor for analyzing and controlling the recycling of drilling mud, wherein the NMR/MRI based integrated system is operated in an online NMR/MRI image analysis method and operatively communicates the analysis results to the drilling mud recycling equipment; and an online feedback controls at least one step in recycling said drilling mud recycling equipment.

In view of this, no document of the state of the art discloses a use of a viscous fluid to contain the saline dissolution homogeneously such as that of the present invention.

Thus, in order to solve such problems, the present invention was developed, in which the use of a viscous fluid allows to homogeneously contain the saline dissolution (not limited to just a saline formation), highlighting the results from seawater with viscosifiers, due to its simplicity, and that it does not have the same impact on the logistical chain as a brine supply. The increase in the viscosity of the fluid suggests limiting the diffusion of salt into the medium and, thus, better containing the dissolution of the well walls, while also promoting a laminar flow regime in the annulus of the well, variables desired to achieve the quality of the cementing operation.

The use of viscous fluid concentrates allows dilutions "on the fly" ("in progress of the action"; that is, the fluid is not previously prepared in a tank, it is diluted with seawater and immediately pumped to the well) with the mixture of seawater fraction in line. The technique can also employ pre-dispersed viscosifying additive solutions that added to seawater mean a substantial increase in the volume of produced drilling fluid, no longer limited by the tank capacity of the unit, which allows drilling large areas of salt.

The direct impacts are the application of a simple and low-cost technique compared to pumping a brine, which makes it possible to build the well at this step without returning and maintaining a focus on integrity, and with a low environmental impact in terms of disposal from a saturated solution on the seabed. In general, it makes it possible to reduce one phase of the construction of the well (since an additional phase would be necessary with return for positioning a casing or liner on top of the salt, using a light synthetic fluid), which represents a great economy in the construction of the well. Other techniques could be employed, such as Riserless Mud Recovery (RMR), but they come up against cost, specialized rigs and in the ultra-deepwater scenario it is unfeasible due to the operational limit of the technique.

Indirect impacts are the contracting of drilling rigs, as it is not limited to units with large tank capacity, which increases the possibility of chartering smaller and cheaper units, in addition to enabling the contracting of units dedicated to non-return serial operations, which directly reduces the daily cost of well construction in a very significant way.

BRIEF DESCRIPTION OF THE INVENTION

The present invention addresses to the use of a viscous fluid of low salinity in drilling operations without return in the presence of a predominantly saline formation, with the objective of preserving a more homogeneous diameter and improving the conditions of well construction.

The most significant field of application is in the construction of wells/drilling, with potential gains in HSE (environmental aspect and well integrity) and costs (cheap inputs, reduction in the number of design phases, making it possible to increase the number of non-return phases with reduced well construction time).

The pumping itself can be done with a direct mixing of the concentrated viscous fluid with seawater in the rig manifold or through continuous mixing equipment, common among fluid companies. The use of dosing pumps or these mixers is desirable when using pre-dispersed viscosifiers, depending on the used concentrations and on the dilution rate.

It can also be used in the preparation of viscous plugs combined with drilling with seawater, in sections where the preservation of a homogeneous diameter is not a priority, serving as a source to assist in carrying the cuttings generated from the drilling phase.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

Figure 1:
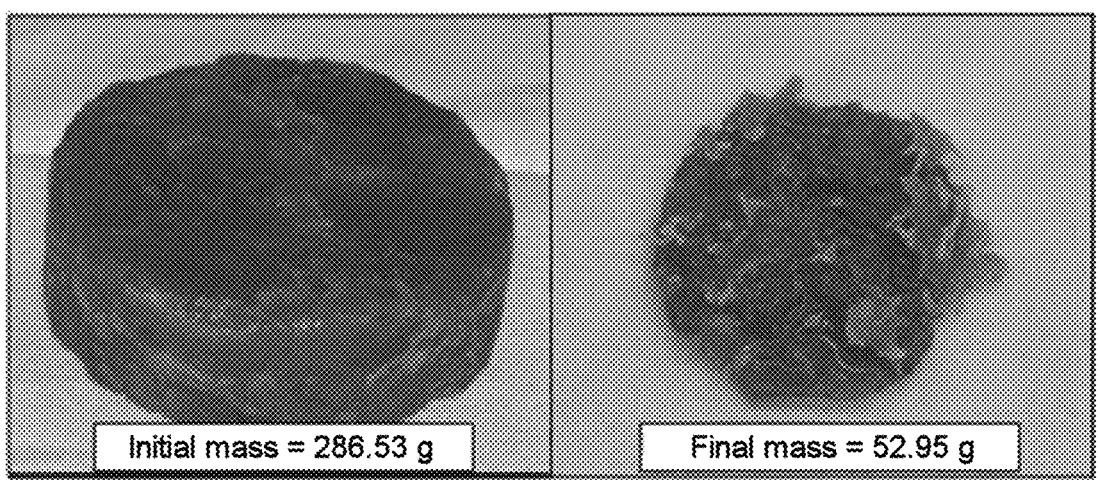
FIG. 1 illustrating a static immersion of a carnallite sample in (a) seawater and (b) brine saturated in NaCl. Exposure time—15 minutes.
Figure 1:
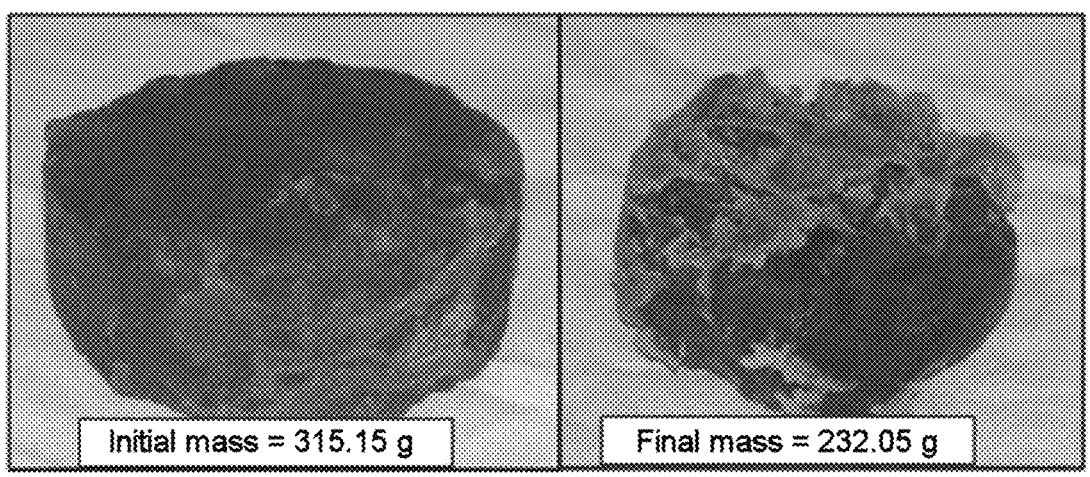

The use of low salinity viscous fluid in non-return drilling operations in the presence of predominantly saline formation according to the present invention comprises in a sequence below that describes a model of Pump and Dump operation, including preparation step and the operation itself. In this example, the objective is to obtain a fluid with a minimum concentration of 1.0 lb/bbl (3.8 kg/m$^3$) of viscosifier (in this case, xanthan gum) prior to pumping the same into the well. The term PAD Mud is only to identify the fluid during the Pump and Dump operation. In addition to xanthan gum, other viscosifying polymers can be used: guar gum, carboxy-methyl-cellulose, etc.

Preparation:

Phase drilling requires the preparation of large volumes of fluids (filling fluids, viscous plugs, in addition to the PAD Mud) and, therefore, it is necessary to provide an operational team for the manufacture of fluid and alignment of transfer and suction lines.

It is observed that, in some drilling rigs, it is necessary to use a tank dedicated to pumping seawater, which restricts the volumetry of other fluids.

The PAD Mud is manufactured in the typical concentration range of 3.0 to 6.0 lb/bbl (11.4 to 22.8 kg/m$^3$) of xanthan gum for dilution with seawater during pumping. PAD Mud can be manufactured in xanthan gum concentrations greater than 6.0 lb/bbl (22.8 kg/m$^3$) (it is not limited, higher concentrations are even desired), as long as the final viscosity allows for pumpability. Other additives can be added to obtain other properties, for example: filter reducer, bactericidal, alkalizing agent and salt.

If a concentration greater than 6.0 lb/bbl (22.8 kg/m$^3$) is used, the pumping flow rate of PAD Mud and seawater must be adjusted so that the output in the standpipe manifold is at the final concentration of viscosifier in the mixture a minimum of 1.0 lb/bbl (3.8 kg/m$^3$).

During formation drilling prior to the saline layer (post-salt), the concentrated PAD Mud is pumped in the form of undiluted cleaning plugs. The volume spent during the post-salt drilling must be promptly replaced so that, when starting the Pump and Dump, the rig has the maximum volume of PAD Mud available.

Part of the concentrated PAD Mud must remain stored in surface tanks and another part in reserve tanks, or even brine (the use must be negotiated with the drilling rig contractor, as its use is restricted, in addition to evaluating issues of pumpability and agitation of the tanks). It is desirable to treat all the PAD mud that is stored prior to the operation with a bactericide, to avoid an excessive time of polymeric fluid made with seawater and standing still in the brine or reserve tanks, it is recommended to recirculate the PAD Mud to the surface tanks periodically, preemptively treating the returned fluid with glutaraldehyde to avoid degradation of the fluid and the release of hydrogen sulfide into the environment ($H_2S$). pH should be maintained in the range of 9.0 to 10.5 with an alkalizing agent.

Alkalizing agents that remain suspended in the PAD Mud are avoided, if the tank does not have agitation.

Before starting the phase drilling, check with the rig team the alignment of the brine tanks with PAD Mud to feed the surface tanks.

Figure 5:
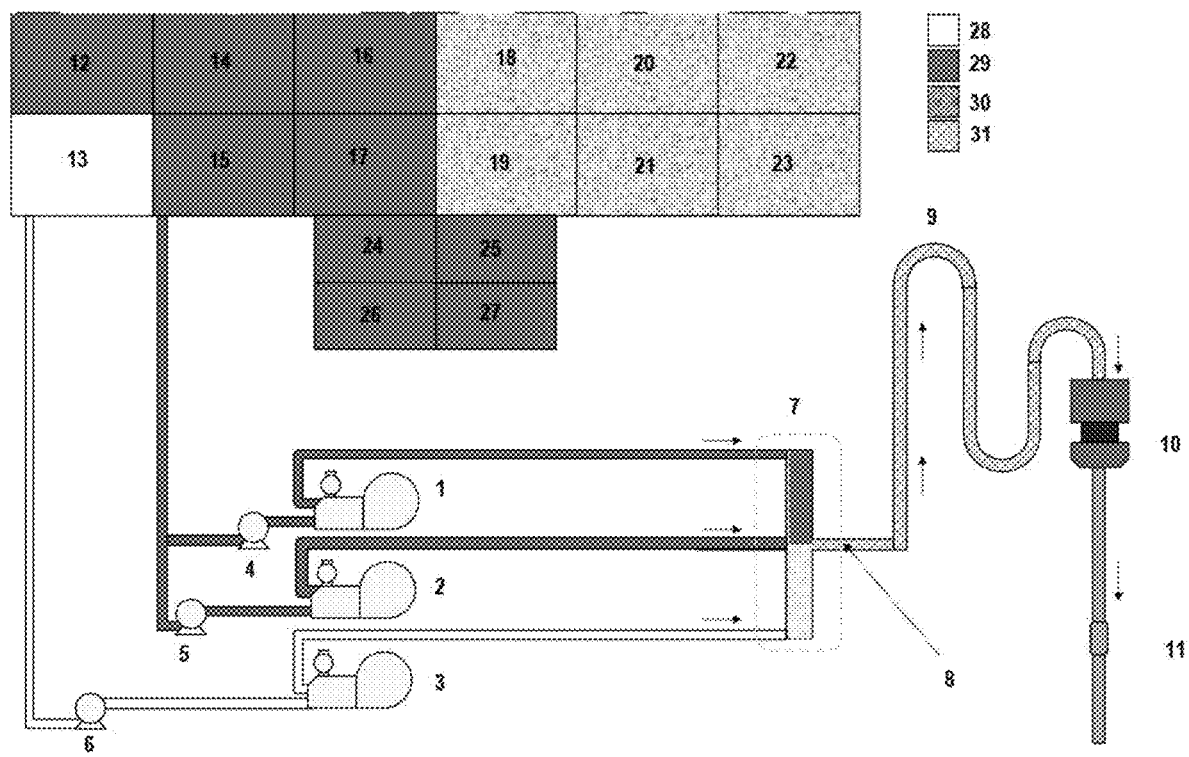
FIG. 5 illustrating a scheme of PAD Mud tanks and pumping. Its components are represented by: pump #1 (1), pump #2 (2), pump #3 (3), pre-load pump #1 (4), pre-load pump #2 (5), pre-load pump #3 (6), Standpipe manifold (7), mixture of Pad Mud with seawater (8), Standpipe (9), Top Drive (10), drill string (11), Tank #1 (12), Tank #2 (13), Tank #3 (14), Tank #4 (15), Tank #5 (16), Tank #6 (17), Tank #7 (18), Tank #8 (19), Tank #9 (20), Tank #10 (21), Tank #11 (22), Tank #12 (23), Slug Tank #1 (24), Slug Tank #2 (25), Chemical Treatment Tank #1 (26), Chemical Treatment Tank #2 (27), Seawater (28), Pad Mud (29), Saturated well filling fluid (30), Diluted drilling fluid (31).

The alignment of the PAD Mud and seawater suction lines is checked, as well as the alignment on the standpipe manifold for the mixture of concentrated PAD Mud and seawater. A suggested scheme for the fluids in the rig tanks before the start of the Pump and Dump can be seen in FIG. 5.

Phase Drilling:

Drill with seawater (high flow rate, for example 1,000 to 1,200 gpm) (3.7854 to 4.5425 m$^3$/min), and pump 80 to 120 bbl (9.539 to 14.309 m$^3$) of viscous fluid or PAD Mud 1.5 to 3.0 lb/bbl (5.7 to 11.4 kg/m$^3$) every 3 drilled sections. Evaluate the cleanliness and adjust the frequency of plugs with the drilling parameters.

Proceed with drilling with seawater and displacement of periodic PAD Mud plugs to the top of the saline formation.

Pump and Dump:

After identifying the change in the formation of anhydrite (common at the top of the saline formation) to halite (indication given by the sudden increase in the penetration rate), the Pump and Dump operation begins, reducing the flow rate to the operating minimum of the drill string directional tool for data acquisition of LWD/MWD (LWD=Logging While Drilling and MWD=Measurement While Drilling). Only start the Pump and Dump when the drilling is already in the halite.

If the minimum flow rate is not possible due to data transmission and tool operation, it is recommended to use the lowest possible flow rate at which the tool will work. It is worth remembering that the lower the flow rate, the greater the autonomy of PAD Mud and the lesser the dissolution of the saline walls of the well.

Once the formation of halite is confirmed by the sudden increase in the penetration rate, the Pump and Dump is started by reducing the seawater flow rate to half of the expected total flow rate and adding the second pump with the same flow rate of concentrated PAD Mud.

The total drilling flow rate is maintained, mixing PAD Mud and seawater, so that the final mixture after the standpipe manifold contains at least 1.0 lb/bbl (3.8 kg/m$^3$) of viscosifier.

If difficulties are observed to pump the PAD Mud with only one pump, more than one pump can be used to divide the flow destined for the PAD Mud in order to avoid cavitation problems (if the fluid is too viscous). Pay attention to the adjustment of the mud pumps so that the final concentration in the drilling flow, after mixing the PAD Mud with the seawater flow in the standpipe manifold, is at least 1.0 lb/bbl (3.8 kg/m$^3$).

After the start of the Pump and Dump, when the first tanks of PAD Mud on the surface run out, there is immediately started the preparation (or dilution) of the filling fluid complement for running the casing down, and for transfers during the withdrawing of the bit.

If anhydrite intercalations occur with a reduction in the drilling rate, it is recommended to reduce the PAD Mud flow rate and increase the seawater flow rate so that the fluid concentration after dilution in the standpipe manifold is lower during the section with low drilling rate. If the advance is too low, evaluate the possibility of using a lower final concentration of viscosifier (by adjusting the PAD Mud and seawater flow rates) to increase the autonomy of this fluid.

At the end of the drilling phase, pump the saturated filling fluid into the bottom to occupy the entire evaporite section.

The string is withdrawn to the top of the evaporite section and filling fluid is pumped to occupy the remainder of the annulus to the seabed.

EXAMPLES

The following examples are presented in order to more fully illustrate the nature of the present invention and the way to practice the same, without, however, being considered as limiting its content.

In a static immersion test of a carnallite pill in seawater and in a fluid saturated in NaCl, for an exposure of only 15 minutes, it is possible to verify a sensitive dissolution both in seawater (FIG. 1a) (more pronounced, 82%) and in NaCl brine (FIG. 1b) (27%). It is important to note that in (b) two effects occur: the preservation of halite and the recrystallization of NaCl salts on the pill.

The recrystallization of NaCl salts on the pill is a demonstration of the displacement of ionic equilibrium, in which, as the diffusion of carnallite into the immersion fluid occurs, there is a displacement of sodium chloride due to the introduction of ions in common, forcing its precipitation.

Figure 2:
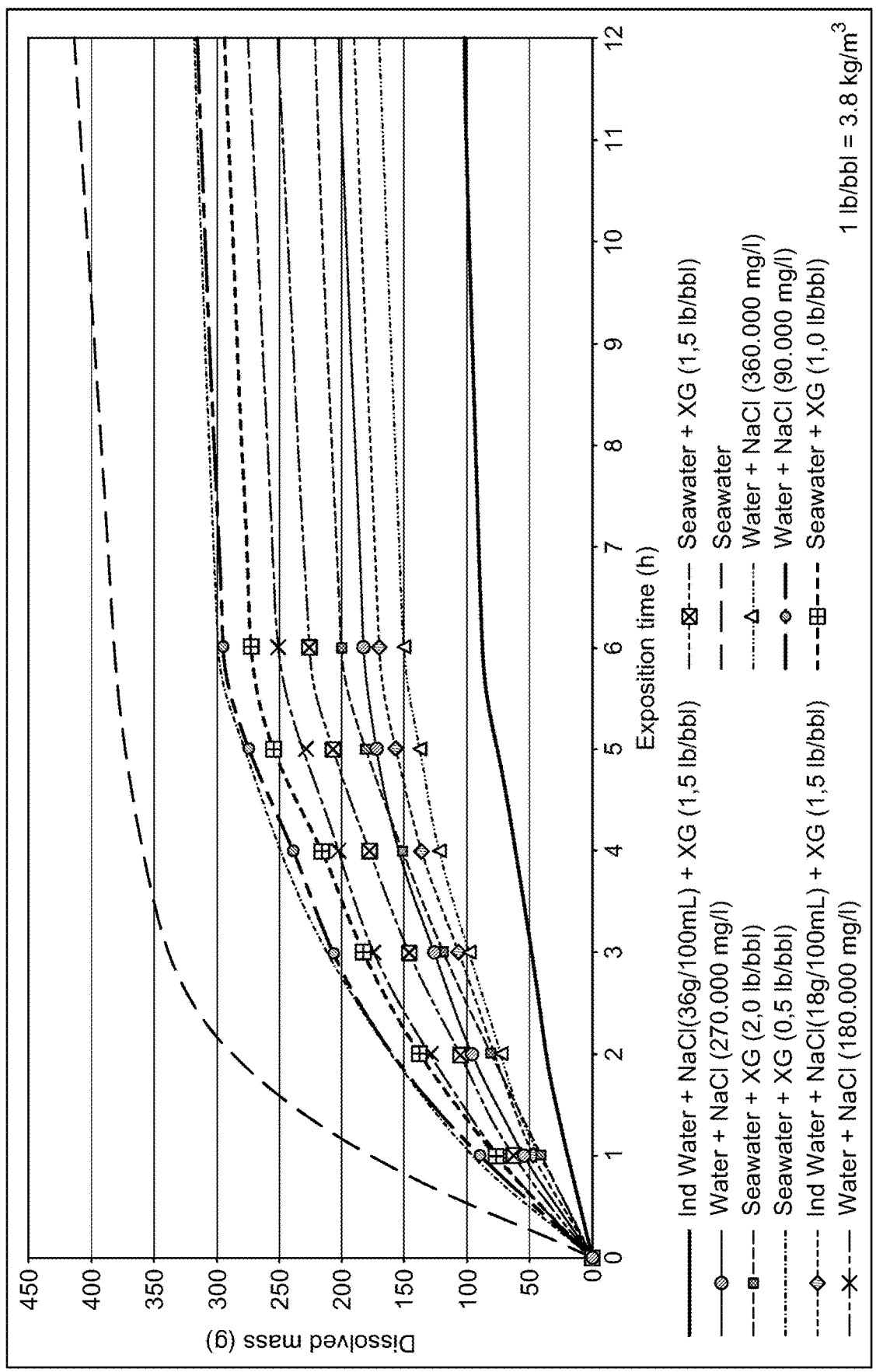
FIG. 2 illustrating a static carnallite dissolution test, exposure interval 12 hours.

In a study carried out to investigate the equilibrium state where the dissolution of a carnallite sample would no longer be evident, focusing on the first 12 hours, analyzing only the variation in salinity and the effect of viscosity, it is possible to notice that the curve behavior (seawater+2.0 lb/bbl (7.61 kg/m$^3$) xanthan gum) resembles a saline solution with 360,000 mg/L NaCl. Under static conditions, the best results are obtained when viscosity and salinity effects are associated (FIG. 2).

Figure 3:
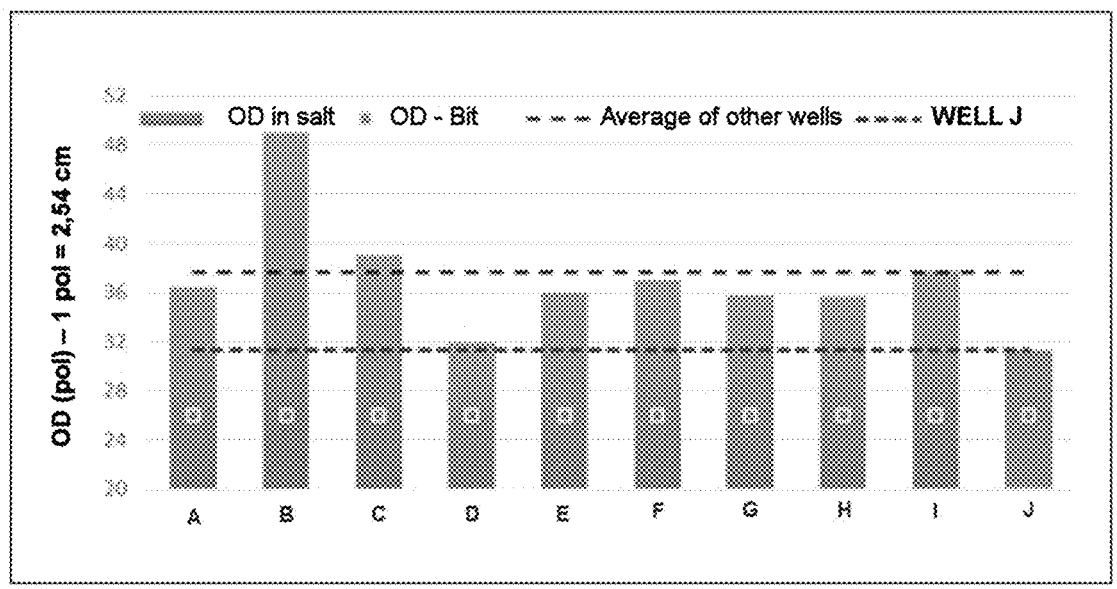
FIG. 3 illustrating historical data on the average diameter of the saline section for the beginning of wells carried out in the same pre-salt field in the Santos Basin, where well J is an example of the application of the technique developed herein.
Figure 4:
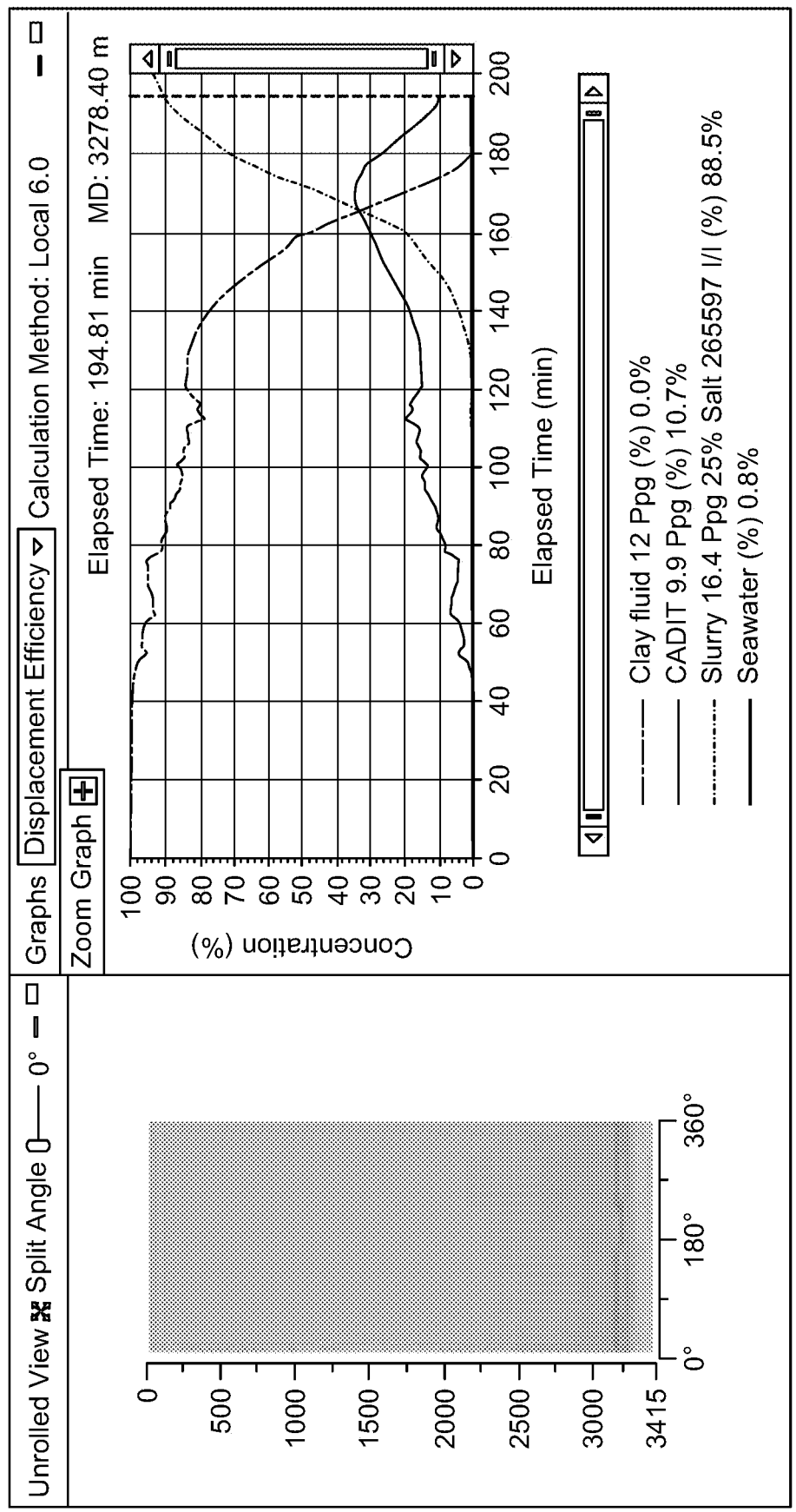
FIG. 4 illustrating a post job of the quality of the cementation of the surface casing, WELL J.

To show the predominant effects, a field test was carried out using viscous seawater to drill the last 120 m of phase salt, without using a dedicated vessel to supply the fluid. In the investigated case, a 50% v/v mixture of seawater with a 50% v/v polymeric Water-Based Drilling Fluid (FPBA) viscosified with xanthan gum, manufactured with additives and seawater, in which the xanthan gum concentration was 3 lb/bbl (11.41 kg/m$^3$). The planned procedure was to manufacture a volume sufficient for 12 hours of drilling, a time based on wells or related drilling. Therefore, resources were previously mobilized and 5,500 bbl (655.8 m$^3$) were manufactured. It was agreed that the drilling flow rate for the saline section would be between 600 and 650 gpm (2.27 and 2.46 m$^3$/min). Some of the important results were:

The global operating time was approximately 40% lower than the reference wells, due to the high performance of the bit used in the phase;

The back analysis of the well diameter indicated an improvement in the condition of the well for successful cementation, with an average diameter of 31.2" (79.248 cm) in the saline section against an average of 37.6" (95.504 cm) in the historical series of the field (wells where phase 2 was all drilled with seawater). FIG. 3 presents a graph with the historical data used for the analysis of the wells in the field and the used well J that refers to the field test. This is a 43% reduction in the volume of dissolved salt (compared to the historical average), which contributes to improving the conditions for cementation;

An analysis of the quality of the cementation was carried out with the data collected during the operation with a commercial removal simulator. FIG. 4 illustrates, on the left, the slurry filling in the annulus without the presence of channeling. On the right, it illustrates the concentration of fluids at a depth 140 m above the shoe, where a high concentration of cement slurry can still be observed.

It is concluded that, with the present invention, it is possible to improve the quality of the well with a significant reduction in salt dissolution at optimized costs with the objective of reducing a phase simultaneously with the Well Containment Analysis (WCA). Thus, the present invention presents advantages such as lower operating costs, reduction in the number of phases, application in a third phase without return (deep post-salt cases) with expected gain of up to 5 days (reduction of well construction time), in addition to employing a low salinity fluid.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A method of application of viscous fluid in drilling saline formations, characterized in that it comprises the following steps:
   (a) Preparation of the fluid:
      (a1) Preparing Pad Mud for dilution with seawater during pumping;
      (a2) Pumping the Pad Mud in the form of cleaning plugs with or without dilution with seawater, according to a programmed viscosity, during drilling to a saline layer (post-salt);
      (a3) Checking an alignment of brine tanks with fluid to feed surface tanks;
      (a4) Checking an alignment of fluid and seawater suction lines, as well as an alignment on a standpipe manifold for the Pad Mud and seawater mixture;
   (b) Phase drilling:
      (b1) Drilling with seawater with a flow rate between 1,000 to 1,200 gpm (3.7854 to 4.5425 m$^3$/min), and pumping plugs of Pad Mud for every 3 drilled sections;
      (b2) Evaluating cleanliness and adjusting plug frequency;
      (b3) Proceeding with seawater drilling and displacement of the plugs to the top of the saline formation;
   (c) Pump and Dump:
      (c1) After identifying a change in the formation of anhydrite to halite, starting a Pump and Dump operation, reducing the seawater flow rate and adding a second pump with a Pad Mud flow rate so that the mixture is equal to the total drilling flow rate and a desired final concentration;

(c2) Maintaining the total drilling flow rate, mixing PAD Mud and seawater, so that the final mixture after the standpipe manifold contains at least 1.0 lb/bbl (3.8 kg/m$^3$) of viscosifier;

(c3) After the start of the Pump and Dump, when first surface tanks of fluid run out, immediately starting the preparation (or dilution) of a complement of saturated filling fluid for running a casing down, and for transfers during withdrawing of a drill bit;

(c4) At the end of the drilling phase, pumping a saturated filling fluid into the bottom to occupy an entire evaporite section; and (c5) Withdrawing a string to a top of the anhydrite and pumping the saturated filling fluid to fill the remainder of an annulus to a seabed.

2. The method according to claim 1, characterized in that the Pad Mud is prepared at a concentration of 1.0 to 6.0 lbm/bbl (3.8 to 22.8 kg/m$^3$) of xanthan gum, or guar gum, or carboxy-methyl-cellulose.

3. The method according to claim 2, characterized in that the Pad Mud is prepared in the concentration of 6.0 lbm/bbl (22.8 kg/m$^3$) of xanthan gum.

4. The method according to claim 1, characterized in that Pad Mud is alternatively prepared in concentrations of xanthan gum greater than 6.0 lbm/bbl (22.8 kg/m$^3$), provided that the final viscosity allows its pumpability.

5. The method according to claim 4, characterized in that there is an adjustment of the Pad Mud flow rate, wherein the Pad Mud is prepared comprising a concentration of xanthan gum greater than 6.0 lb/bbl (22.8 kg/m$^3$), and the seawater flow rate so that the final mixture in the standpipe manifold is a minimum of 1.0 lb/bbl (3.8 kg/m$^3$).

6. The method according to claim 1, characterized in that the Pad Mud is prepared with additives, the additives comprising filtrate reducer, bactericide, alkalizing agent, and/or salt.

7. The method according to claim 1, characterized in that part of the Pad Mud is stored in the surface tanks and another part in reserve tanks or brine tanks.

8. The method according to claim 7, characterized in that the Pad Mud is treated prior to the operation with bactericide.

9. The method according to claim 7, characterized in that the Pad Mud is periodically recirculated to the surface tanks, treating the recirculated fluid with a bactericide and maintaining the pH in the range of 9.0 to 10.5 with an alkalizing agent.

10. The method according to claim 9, characterized in that the bactericide is glutaraldehyde.

11. The method according to claim 1, characterized in that the flow rate ratios between the seawater pump and the Pad Mud are changed depending on operating conditions, varying the final concentration of viscosifier between 1.0 lb/bbl (3.8 kg/m$^3$) and the maximum concentration prepared on the surface, if there are pumpability conditions.

* * * * *